US010018267B2

(12) United States Patent
Hathaway et al.

(10) Patent No.: US 10,018,267 B2
(45) Date of Patent: Jul. 10, 2018

(54) VEHICLE TRANSMISSION CONTROL MODULE RESET DETECTION AND MITIGATION

(71) Applicant: Ford Global Technologies, LLC, Dearborn, MI (US)

(72) Inventors: Richard Reynolds Hathaway, Livonia, MI (US); Steven Laile Pearce, Northville, MI (US); Steven Craig Meisner, Dexter, MI (US); Edward Katynski, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 361 days.

(21) Appl. No.: 15/067,504

(22) Filed: Mar. 11, 2016

(65) Prior Publication Data

US 2017/0261099 A1   Sep. 14, 2017

(51) Int. Cl.
*F16H 61/02* (2006.01)
*F16H 61/688* (2006.01)
*G07C 5/08* (2006.01)
*F16H 3/00* (2006.01)

(52) U.S. Cl.
CPC ....... *F16H 61/0213* (2013.01); *F16H 61/688* (2013.01); *G07C 5/0808* (2013.01); *F16H 3/006* (2013.01)

(58) Field of Classification Search
CPC ...... F16H 59/50; F16H 59/68; F16H 61/0213; F16H 61/688; F16H 61/12; F16H 2061/0053; F16H 2061/0068; F16H 2061/0218; F16H 2061/0223; F16H 2061/0227; F16H 2061/0234; F16H 2061/1208; F16H 2061/1224; F16H 2061/1232; F16H 2061/126
See application file for complete search history.

(56) References Cited

U.S. PATENT DOCUMENTS

| 6,879,891 | B1 | 4/2005 | Bederna | |
|---|---|---|---|---|
| 8,712,635 | B2 | 4/2014 | Hashimoto | |
| 9,058,419 | B2 | 6/2015 | Costin et al. | |
| 2002/0065167 | A1* | 5/2002 | Yeo | F16H 59/62 477/97 |
| 2006/0276300 | A1* | 12/2006 | Kashiwagi | F16H 61/12 477/34 |
| 2010/0305802 | A1* | 12/2010 | Seufert | F16H 61/12 701/33.9 |
| 2012/0239222 | A1* | 9/2012 | Keckeisen | B60W 50/0205 701/1 |
| 2012/0296531 | A1* | 11/2012 | Hyodo | E02F 9/2079 701/50 |
| 2013/0325203 | A1 | 12/2013 | Lu et al. | |

(Continued)

*Primary Examiner* — Edwin A Young
(74) *Attorney, Agent, or Firm* — James Dottavio; Brooks Kushman P.C.

(57) ABSTRACT

A system and method for controlling a vehicle include a manual transmission operated by a controller in communication with shift actuators and programmed to, in response to each controller reset less than a threshold number of resets, control each shift actuator that was not moving at the time of the reset based on respective shift actuator positions stored prior to the reset, and to control the shift actuators to limit available gear ratios in response to the reset exceeding the threshold number of resets.

20 Claims, 3 Drawing Sheets

(56) References Cited

U.S. PATENT DOCUMENTS

2014/0136060 A1* 5/2014 Deurloo .............. F16H 61/0204
 701/51
2014/0222266 A1 8/2014 Kim et al.
2015/0161829 A1 6/2015 Julson et al.

* cited by examiner

VEHICLE TRANSMISSION CONTROL MODULE RESET DETECTION AND MITIGATION

TECHNICAL FIELD

The present disclosure relates to detection of a transmission control module reset and control of a vehicle in response to detection of the reset.

BACKGROUND

Vehicle controllers may include hardware and software logic that resets the controller in an attempt to resume operation after encountering various operating anomalies. However, some intermittent operating anomalies may be associated with component degradation and may indicate that a component may need service or replacement, particularly if the resets occur frequently or the frequency of resets continues to increase. A controller reset may also interrupt diagnostic routines and storing of associated diagnostic codes making it more difficult for the vehicle system to alert an operator and more difficult for service technicians to quickly identify the root cause of the reset.

SUMMARY

In various embodiments, a system and method for controlling a vehicle include a manual transmission operated by a controller in communication with shift actuators and programmed to, in response to each controller hardware reset less than a threshold number of resets, control each shift actuator that was not moving at the time of the reset, based on respective shift actuator positions stored prior to the reset, and control the shift actuators to limit available gear ratios in response to the reset exceeding the threshold number of resets. The controller may be further programmed to store a diagnostic code in response to the number of resets exceeding the threshold. The stored diagnostic code may be reset in response to a signal from a diagnostic tool in communication with the controller, or reset in response to a number of key cycles without a controller hardware reset exceeding a corresponding threshold number of key cycles. In one or more embodiments, the limited available gear ratios limit movement of the shift actuators or shift drums in anticipation of an increasing frequency of controller hardware resets where shift drum position may be lost.

In at least one embodiment, a manual transmission includes first and second motor operated dry friction clutches to selectively couple an engine to respective first and second transmission input shafts, and first and second clutch position sensors associated with the first and second motor operated dry friction clutches. The controller may be further programmed to limit available gears or gear ratios in response to intermittent loss of signals from the first or second clutch position sensors that exceed a threshold number of signal losses. The controller may be further programmed to delay movement of the shift actuators after the hardware reset until after receiving at least one of a calculated gear ratio matching a gear selection associated with stored shift actuator positions, notification of expiration of a delay timer when the vehicle is stationary, and expiration of a watchdog timer if the calculated gear ratio does not match the gear selection associated with the stored shift actuator positions.

Embodiments may also include a gear range selector in communication with the controller where the controller is further programmed to limit available gear ratios in response to intermittent loss of power to the gear range selector exceeding a threshold number of power losses. The controller may be further programmed to store current vehicle mileage in response to each hardware reset, and to store the current vehicle mileage in response to the number of hardware resets exceeding the threshold number of resets.

Embodiments may also include a method for controlling a vehicle having a manual transmission with motor actuated shift drums that includes operating the shift drum motors by a controller in response to a hardware reset less than a threshold number of resets based on shift drum position data stored before the hardware reset, and limiting shift drum movement if the hardware reset exceeds the threshold number of resets.

In various embodiments, a non-transitory computer readable medium is provided having stored instructions that, when executed by a processor, control a vehicle transmission to limit available gears by restricting shift drum movement to effect the available gears in response to a number of hardware resets exceeding a threshold number of resets. The computer readable medium includes instructions to control the shift drum movement based on a position stored in non-volatile memory prior to a hardware reset if the number of resets is less than the threshold number of resets. The computer readable medium may also include instructions that store a diagnostic code in response to the hardware resets exceeding the threshold, and instructions that delay shift drum movement after a hardware reset for a predetermined period of time. The computer readable medium may also include stored instructions that restrict shift drum movement after a hardware reset until at least one of a calculated gear ratio matches a selected gear and a watchdog timer expires.

Embodiments according to the present disclosure may provide one or more advantages. For example, systems and methods for vehicle or powertrain control according to at least one embodiment of the disclosure may be used to isolate or categorize the cause of a controller reset with respect to whether the reset was associated with controller software, hardware, or an external source. Various embodiments improve powertrain system recovery and the availability of a running reset so that the vehicle continues to operate to allow the operator to complete a trip or drive the vehicle to a service location. Storing of statistical data relative to the time and/or mileage of a reset, the distance traveled between resets, the number of drive cycles between resets, and similar data in non-volatile memory facilitates identification of component performance issues that may continue to degrade or escalate, and improves the ability of service personnel to quickly and accurately identify the root cause of the resets. Limiting available gears and associated higher engine speeds may alert the vehicle operator to a powertrain issue and encourage a service visit before component degradation impacts vehicle drivability.

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed are not to be interpreted as limiting, but merely as a representative basis for teaching one skilled in the art to make and use the claimed subject matter.

The embodiments of the present disclosure generally provide for various types of sensors, actuators, and processors that may be in communication with one another by direct wired or wireless connection, or over a wired or wireless vehicle network using various protocols, such as a controller area network (CAN), for example. All references to the sensors, actuators, controllers, processors, control modules, etc. and the functionality provided by each, are not intended to be limited to encompassing only what is illustrated and described herein. While particular labels may be assigned to the various components, such labels are not intended to limit the scope of operation of the components. Various sensors, actuators and controllers may be combined or integrated with each other and/or separated based on the particular application and implementation.

Controllers, control modules, or control circuitry generally referred to herein may include any number of discrete passive and active components such as resistors, capacitors, transistors, amplifiers, analog/digital converters (ADC or A/D converters), microprocessors, integrated circuits, non-transitory memory devices (e.g., FLASH, random access memory (RAM), non-volatile RAM (NVRAM), read only memory (ROM), electrically programmable read only memory (EPROM), electrically erasable programmable read only memory (EEPROM), or other suitable variants thereof). One or more memory devices may include stored instructions or software and related calibration parameters stored in arrays or lookup tables that cooperate with one another to perform operations described herein. In addition, any one or more of the devices may be configured to execute a computer program or control logic embodied in a non-transitory computer readable storage medium that includes instructions to program a computer or controller to perform any number of the functions as disclosed.

Figure 1:
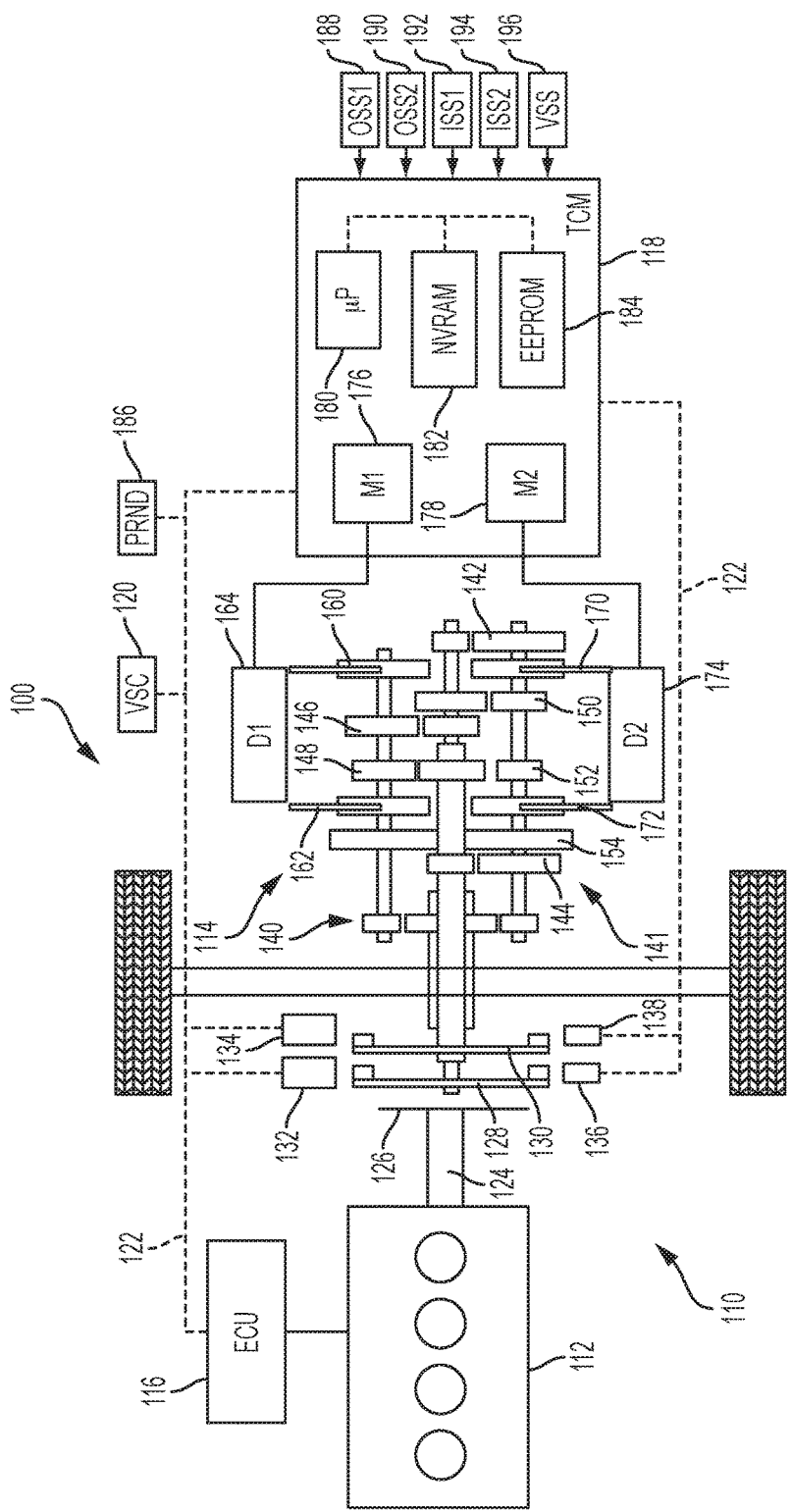
FIG. 1 is a schematic diagram illustrating a vehicle including control module reset detection and mitigation according to one or more embodiments of the disclosure.

FIG. 1 is a block diagram of a representative vehicle 100 in a system or method for detection and mitigation of vehicle controller resets according to various embodiments. Vehicle 100 includes a powertrain 110 including an internal combustion engine 112 selectively coupled to a transmission 114. In the representative embodiment illustrated, powertrain 110 is a front wheel drive powertrain with transmission 114 implemented by a dual clutch automated mechanical or manual transmission. Those of ordinary skill in the art will recognize that the teachings of the disclosure are applicable to other powertrain configurations that may include different prime movers and alternative types of transmissions.

Vehicle 100 may include one or more microprocessor-based controllers or control modules, such as engine control unit (ECU) 116, transmission control module (TCM) 118, and vehicle system controller (VSC) 120, that directly or indirectly coordinate and control associated vehicle systems and components. The controllers may communicate with one or more other controllers, sensors, and/or actuators via a serial peripheral interface (SPI) bus (e.g., Controller Area Network (CAN)) or via discrete conductors, such as may be provided in a wiring harness, for example, and as generally represented by reference number 122. Various operating parameters or variables may be broadcast or published using the CAN or other conductors for use by vehicle control modules or subsystems in controlling the vehicle or vehicle components.

In the representative embodiment illustrated in FIG. 1, transmission 114 is a dual clutch mechanical or manual transmission controlled by TCM 118 using various sensors and actuators to control operations such as clutch engagement/disengagement, gear pre-selection, gear shifting, etc. based on vehicle and ambient operating conditions. Transmission 114 includes first and second concentric input shafts selectively coupled to crankshaft 124 and flywheel 126 of engine 112 via a first dry friction clutch 128 and a second dry friction clutch 130 that may be operated by corresponding motor/actuators 132, 134 in response to commands from TCM 118. Clutch position sensors 136, 138 provide corresponding clutch position signals based on the relative position of clutch 128 and 130. In one embodiment, sensors 136, 138 are implemented by Hall effect sensors.

Output of transmission 114 is connected through a differential assembly 140 to the vehicle wheels by associated half-shafts with a desired torque ratio between the input shafts and output provided by selection of gears 141, which may include a first gear 142, a second gear 144, a third gear 146, a fourth gear 148, a fifth gear 150, a sixth gear 152, and a reverse gear 154. Gears may be preselected in anticipation of a gear change and selected to provide a desired gear ratio or gear by operation of shift forks 160, 162, 170, 172 that may be moved by rotation of an associated shift drum 164, 174 and actuator motor 176, 178. In the embodiment illustrated in FIG. 1, actuator motors 176, 178 are contained within a common housing of TCM 118 and may be connected by one or more gears or shafts to corresponding shift drums 164, 174.

TCM 118 includes a microprocessor 180 and various types of associated memory or non-transitory computer readable storage media that may include volatile and non-volatile memory as previously described. In one embodiment, non-volatile memory may include NVRAM 182 and EEPROM 184 that may be used to store diagnostic codes, track controller software or hardware resets, and track intermittent sensor or power signals as described in greater detail herein. TCM 118 communicates with a number of sensors and actuators to control operation of transmission 114, with representative sensors and actuators illustrated in FIG. 1 that may also include a transmission range selector (TRS or PRNDL) 186 for selection of a desired gear or driving mode by the vehicle operator. Other sensor signals or associated parameters received by TCM 118 may include signals or parameters from output speed sensors 188, 190, input speed sensors 192, 194, and a vehicle speed sensor 196, for example. The input and output speed sensors may be used to calculate a speed ratio to verify a current gear ratio after a controller reset, for example. The vehicle speed sensor may be used to determine whether the vehicle is moving during reset mitigation strategies as well as for shift scheduling, which may include pre-selection of a particular gear, for example.

Hardware and software control logic within TCM 118 performs various initialization procedures to check operation of both internal and external circuitry, memory, power supplies, sensors, etc. For example, proper operation and position of shift drums 164, 174 may be determined during initialization by moving each shift drum 164, 174 to one or more positive stops so that relative rotational position may be ascertained based on operation of stepper motors 176, 178. TCM 118 may load various operating parameters from memory during power-up initialization and store various operating parameters to memory during an orderly shutdown. Anomalies in operating signals may occur during normal vehicle operation due to any of a number of intermittent conditions, some of which may trigger a controller reset in an attempt to recover operation. However, various operating variables may be erased or otherwise lost during a reset that may make it difficult to track occurrences of resets and identify the associated root cause of the resets. While most such conditions occur infrequently, embodiments according to the present disclosure recognize that a regular pattern or increasing frequency of hardware or software resets may be used to provide an early indication of component degradation, and early intervention may avoid component failures that could result in loss of vehicle motion. As such, embodiments according to the present disclosure provide a system and method of controller reset detection and mitigation.

As illustrated in the representative embodiment of FIG. 1, vehicle 100 includes transmission 114 having a controller 118 in communication with shift actuators 164, 174 and programmed to, in response to each controller reset less than a threshold number of resets, control each shift actuator 164, 174 that was not moving at the time of the reset based on respective shift actuator positions stored in memory 184 prior to the reset, and control the shift actuators 164, 174 to limit available gear ratios in response to the reset exceeding the threshold as illustrated and described in greater detail with reference to FIGS. 2-6. In various embodiments, the threshold number of resets is set to three and the shift drum position is stored in EEPROM 184 every 2.5 mS to improve reset recovery for running resets (e.g. while the vehicle 100 is moving) in addition to storing in NVRAM 182 during shutdown.

Figure 2:
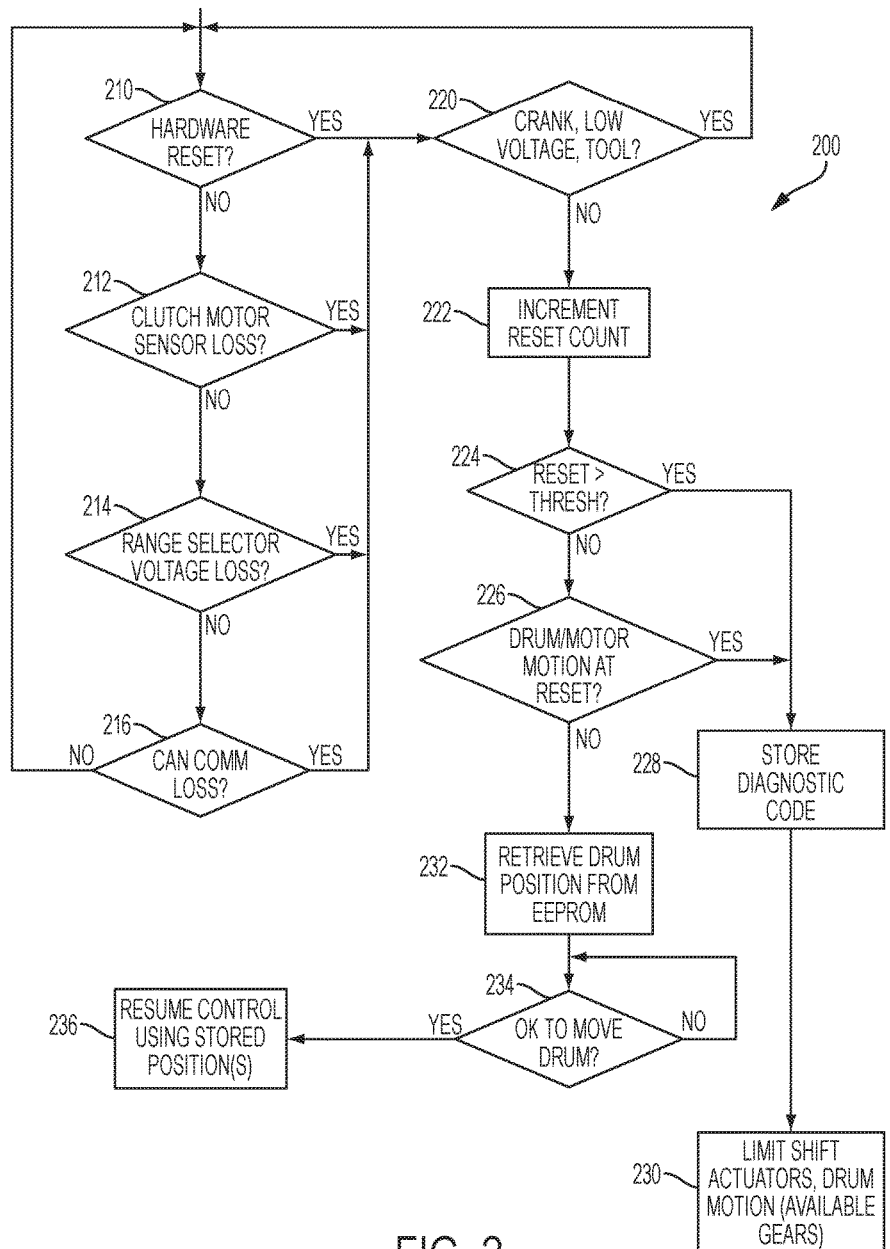
FIG. 2 is a flow chart illustrating operation of a system or method for controller reset detection and mitigation according to embodiments of the disclosure.

FIG. 2 is a flow chart illustrating operation of a representative system or method for controller reset detection and mitigation according to various embodiments. As generally understood by those of ordinary skill in the art, the system or method 200 may be implemented through a computer algorithm, machine executable code, or software instructions programmed into one or more suitable programmable logic devices that may include one or more processors associated with the vehicle, such as ECU 116, TCM 118, and/or VSC 120, for example. Although the various operations illustrated appear to occur in a chronological order or sequence, one or more of the operations or features may be performed in a different order, may be repeatedly performed, may be performed concurrently, or may be omitted not at all whether or not explicitly illustrated or described as such.

System or method 200 may include software that detects a hardware reset as represented at 210. The controller hardware may provide various shift registers or other means to interface with the program logic to indicate the status of various hardware functions. Various other vehicle or transmission components may also be monitored for conditions that may indicate component degradation of the component and/or the component communication or connection to the processor (TCM 118). For example, solder connections subjected to thermal cycling may provide intermittent electrical connections that may result in a hardware reset 210. Similarly, the system or method 200 may monitor the clutch motor position sensor(s) to detect loss of the clutch motor position signal as represented at 212, transmission range selector (TRS or PRNDL) low voltage or voltage loss as represented at 214, and loss of CAN communications as represented at 216. Other sensor or actuator signals may be monitored to detect intermittent signal loss that may lead to a loss of vehicle motion depending on the particular application and implementation.

The detected reset or signal loss may be categorized as one that may lead to loss of vehicle motion at block 220 by eliminating any resets or signal losses associated with engine cranking, system low voltage, connection or operation of a diagnostic or service tool, or other software related causes, for example. If the reset or signal loss is not associated with one of the excluded events, a reset counter is incremented at 222 and stored in non-volatile memory so that resets can be tracked to identify a pattern or increasing frequency of resets. In some embodiments, the reset counter may be cleared or decremented after a predetermined number of orderly shutdowns, such as 20 or 30 key cycles, for example.

Block 224 determines if the reset exceeds an associated threshold number of resets based on the stored reset counter. In one embodiment, the threshold number of resets is three, although this number may vary depending on the particular empirical data, suspected root cause, anticipated rate of progression, or various other factors associated with a particular component. For resets that do not exceed the threshold at 224, block 226 determines whether the shift actuator (which may include the shift drum and/or motor) was commanded ON when the reset occurred, which may be indicated by a flag or parameter stored in non-volatile memory, for example. If the shift actuator motor was commanded ON at the time of the reset, the relative position of the shift drum may be lost during the reset, which may require the vehicle to be stationary to re-initialize the shift drum position. Each shift drum may be tested separately to improve the ability to recover from a running reset so that loss of position of one shift drum does not cascade to the other.

If the number of resets exceeds the threshold at 224, or if the actuator motor was commanded ON at the time of the reset, control passes to block 228 where a diagnostic code is triggered that will be stored in non-volatile memory during the next orderly shutdown. A warning light or other service message may also be displayed on a vehicle instrument panel and/or display to alert the operator. Additional statistics may also be stored for use in tracking or diagnosing any potential component issues. For example, a current mileage or odometer reading may be stored for each reset to track occurrence and frequency of resets. The available gears may be limited as represented at 230 to limit shift actuator and shift drum motion as described in greater detail with reference to FIGS. 3A and 3B. Limiting the highest available gear (or lowest available gear ratio) may also result in higher engine speeds at higher vehicle speeds to encourage the operator to seek service.

If the actuator motor was not commanded ON at the time of the reset as determined at block 226, block 232 retrieves the associated drum position from non-volatile memory, which is implemented by EEPROM in this embodiment. A state machine determines whether the shift drums should be allowed to move as represented at block 234. The status of the state machine may be based on various factors. In one embodiment, the state machine will allow movement of the shift drums for a normal power-up, for a stationary reset (where the vehicle speed is zero or below a corresponding threshold) after a predetermined period of time, for a running or rolling reset based on a calculated gear or gear ratio using input and output speed sensor signals, or when a watchdog timer expires. The watchdog timer will release the shift drum movement when the calculated gear ratio does not match the gear state of the selector after a corresponding time period, which may indicate that the drive mode conditions have changed or that the transmission is in neutral, for example. Once the state machine indicates that the shift drums can move at 234, control resumes using the stored positions as represented at 236.

Figure 3A:
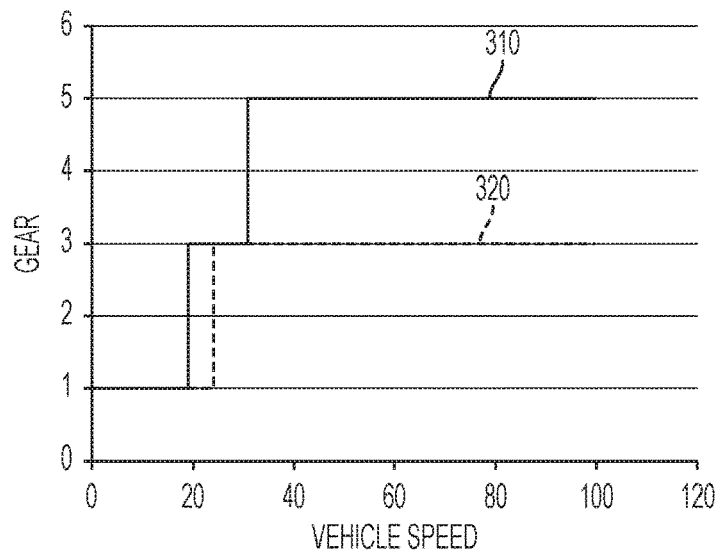
FIGS. 3A and 3B illustrate limiting available gears to limit shift drum movement in response to a controller reset according to embodiments of the disclosure.
Figure 3B:
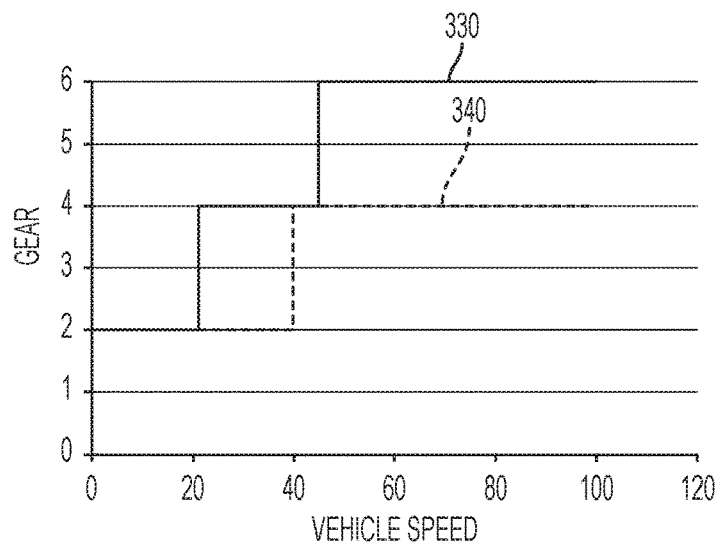

FIGS. 3A and 3B illustrate a representative embodiment for limiting shift drum motion by limiting available gears in response to the number of resets exceeding a corresponding threshold. In the embodiment of FIGS. 3A and 3B, a six-speed transmission using two shift drums has available gear ratios or gears limited to first through fourth gear in response to controller resets exceeding a threshold number of resets. For the six-speed transmission configuration illustrated in the representative embodiments, the first shift drum controls selection of odd gears one, three, and five, while the second shift drum controls selection of even gears two, four, and six. FIG. 3A illustrates limited motion of the first shift drum for upshifts and downshifts, while FIG. 3B illustrates limited motion of the second shift drum for upshifts and downshifts. Those of ordinary skill in the art will recognize that the number of shift drums will vary based on the number of gears and the particular configuration of the transmission.

As shown in FIG. 3A, a first shift drum movement or motion for downshifts is represented by line 310 while movements for upshifts are represented by line 320. As shown by line 320 in the chart of FIG. 3A, the first shift drum moves only one time while accelerating and only one time while decelerating (unless the first shift drum is in the $5^{th}$ gear position when the available gears are limited, then it will move twice while decelerating but will be limited to a single movement once the shift drum is in the $3^{rd}$ gear position).

As shown in FIG. 3B, a second shift drum movement or motion for downshifts is represented by line 330 while movements for upshifts are represented by line 340. Similar to the operation of the first shift drum illustrated in FIG. 3A, line 330 indicates that the second shift drum position will move twice if the transmission is in sixth gear when the available gears are limited in response to a reset exceeding an associated threshold number of resets as the vehicle speed decreases and the transmission downshifts. Subsequent acceleration and deceleration events limit movement of the second shift drum to a single movement between selection of second and fourth gears by limiting the highest available gear to fourth gear. This effectively limits the second shift drum movements while also increasing engine speed at higher vehicle speeds to alert the vehicle operator and encourage a service visit.

In operation, the available gears (6 in this example) are limited to gears 1-4 to limit the shift drum movements in anticipation of subsequent controller resets to improve the availability of a running reset recovery since it will be less likely that a particular shift drum will be moving at the time of the reset. For a stationary vehicle with available gears limited to 1-4 (5th and 6th gears disabled), the first and second shift drums move once on acceleration to shift through first, second, third, and fourth gears, and once on a deceleration to downshift back to first gear. Otherwise the shift drums do not move. In a representative vehicle at 45 mph, the first shift drum will be in $3^{rd}$ gear position and the second shift drum will be in $4^{th}$ gear position with the first and second clutches controlled accordingly to provide either $3^{rd}$ gear or $4^{th}$ gear such that any additional hardware reset will not risk losing shift drum position because the shift drums are held in the $3^{rd}$ and $4^{th}$ positions, respectively. This results in the engine speed being higher than when the available gears are not limited at higher vehicle speeds while also allowing the vehicle to reach typical highway speeds before hitting the engine speed limit.

While one or more embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that may not be explicitly described or illustrated. Various embodiments may have been described as providing advantages or being preferred over other embodiments or prior art implementations with respect to one or more desired characteristics. However, as one of ordinary skill in the art is aware, one or more features or characteristics may be compromised to achieve desired overall system attributes, which depend on the specific application and implementation. These attributes may include, but are not limited to: cost, strength, security, durability, life cycle cost, marketability, appearance, packaging, size, serviceability, weight, manufacturability, ease of assembly, etc. Embodiments described as less desirable than other embodiments or prior art implementations with respect to one or more characteristics are not outside the scope of the disclosure or claims and may be desirable for particular applications.

What is claimed is:

1. A vehicle comprising:
a transmission having a controller in communication with shift actuators and programmed to, in response to each controller reset less than a threshold number of resets, control each of the shift actuators that was not moving when the reset occurred based on respective shift actuator positions stored prior to the reset, and in response to the reset exceeding the threshold, control the shift actuators to limit available gear ratios.

2. The vehicle of claim 1, the controller further programmed to store a diagnostic code in response to the reset exceeding the threshold.

3. The vehicle of claim 2, the diagnostic code being reset in response to a signal from a diagnostic tool in communication with the controller.

4. The vehicle of claim 2, the diagnostic code being reset in response to a number of key cycles without a reset exceeding a corresponding threshold number of key cycles.

5. The vehicle of claim 1, the available gear ratios limiting movement of the shift actuators in anticipation of an increasing frequency of controller hardware resets.

6. The vehicle of claim 1, the transmission further comprising:
first and second motor operated mechanical friction clutches to selectively couple an engine to respective first and second transmission input shafts; and
first and second clutch position sensors associated with the first and second motor operated mechanical friction clutches, the controller further programmed to limit available gear ratios in response to intermittent loss of signals from the first or second clutch position sensors that exceed a threshold number of signal losses.

7. The vehicle of claim 1, the controller further programmed to delay movement of the shift actuators after the reset until after receiving at least one of a calculated gear ratio matching a gear selection associated with stored shift actuator positions, notification of expiration of a delay timer when the vehicle is stationary, and expiration of a watchdog timer if the calculated gear ratio does not match the gear selection associated with the stored shift actuator positions.

8. The vehicle of claim 1 further comprising a gear range selector in communication with the controller, the controller further programmed to limit available gear ratios in response to intermittent loss of power to the gear range selector exceeding a threshold number of power losses.

9. The vehicle of claim 1, the controller further programmed to store current vehicle mileage in response to each reset, and to store the current vehicle mileage in response to the reset exceeding the threshold number of resets.

10. A method for controlling a vehicle having a manual transmission with motor actuated shift drums, comprising:
operating the shift drum motors by a controller in response to a hardware reset less than a threshold number of resets based on shift drum position data stored before the hardware reset; and
limiting shift drum movement if the hardware reset exceeds the threshold.

11. The method of claim 10 further comprising delaying operating of the shift drum motors after the hardware reset until at least one of a predetermined time has expired, and a calculated gear ratio matches a gear ratio associated with a gear range selector.

12. The method of claim 10 further comprising storing a diagnostic code in response to the hardware reset exceeding the threshold.

13. The method of claim 12 wherein storing the diagnostic code comprises storing the diagnostic code in non-volatile memory during controller shutdown.

14. The method of claim 10, wherein limiting shift drum movement comprises limiting a number of available gears.

15. The method of claim 10, the manual transmission including first and second dry clutches operated by the controller to selectively couple an engine to respective first and second transmission input shafts, the method further comprising limiting the shift drum movement in response to loss of a clutch position sensor signal exceeding a corresponding threshold.

16. The method of claim 10 further comprising controlling transmission shifting based on a modified shift schedule that limits a highest available gear to a lower gear than otherwise available in response to the hardware reset exceeding the threshold.

17. A non-transitory computer readable medium having stored instructions that, when executed by a processor, control a vehicle transmission to limit available gears by restricting shift drum movement to effect the available gears in response to a number of hardware resets exceeding a threshold number of resets, and to control the shift drum movement based on a position stored in non-volatile memory prior to a hardware reset.

18. The computer readable medium of claim 17 further comprising stored instructions that store a diagnostic code in response to the hardware resets exceeding the threshold.

19. The computer readable medium of claim 17 further comprising stored instructions that delay shift drum movement after a hardware reset for a predetermined period of time.

20. The computer readable medium of claim 17 further comprising stored instructions that restrict shift drum movement after a hardware reset until at least one of a calculated gear ratio matches a selected gear and a watchdog timer expires.

* * * * *